United States Patent
Sperka et al.

(10) Patent No.: US 8,349,246 B2
(45) Date of Patent: Jan. 8, 2013

(54) BLOWING APPARATUS FOR EXPANDING CONTAINERS

(75) Inventors: Wolfgang Sperka, Dingolfing (DE); Erik Blochmann, Neutraubling (DE); Florian Geltinger, Neufahrn (DE)

(73) Assignee: Krones AG (DE)

( * ) Notice: Subject to any disclaimer, the term of this patent is extended or adjusted under 35 U.S.C. 154(b) by 251 days.

(21) Appl. No.: 12/665,668

(22) PCT Filed: Jul. 4, 2008

(86) PCT No.: PCT/EP2008/058665
§ 371 (c)(1), (2), (4) Date: Feb. 26, 2010

(87) PCT Pub. No.: WO2009/007315
PCT Pub. Date: Jan. 15, 2009

(65) Prior Publication Data
US 2010/0176540 A1    Jul. 15, 2010

(30) Foreign Application Priority Data
Jul. 10, 2007    (DE) .......................... 10 2007 032 434

(51) Int. Cl.
*B29C 49/00*    (2006.01)

(52) U.S. Cl. ........ 264/523; 264/522; 264/535; 425/522; 425/535

(58) Field of Classification Search .................. None
See application file for complete search history.

(56) References Cited

U.S. PATENT DOCUMENTS

| | | | |
|---|---|---|---|
| 4,552,527 A | 11/1985 | Hunter | 425/535 |
| 7,563,092 B2 | 7/2009 | Mie | 425/535 |
| 2003/0077349 A1 | 4/2003 | Derouault et al. | 425/145 |
| 2008/0286402 A1 | 11/2008 | Mie | 425/525 |

FOREIGN PATENT DOCUMENTS

| | | |
|---|---|---|
| FR | 2 876 942 | 4/2006 |
| FR | 2 912 678 | 8/2008 |

OTHER PUBLICATIONS

Chinese Office Action, Appln. No. 200880024141 dated Aug. 3, 2012, 6 pages.
International Search Report issued for PCT/EP2008/058665, dated Dec. 3, 2009 (10 pgs).

*Primary Examiner* — Monica A Huson
(74) *Attorney, Agent, or Firm* — Hayes Soloway P.C.

(57) ABSTRACT

A blowing apparatus for expanding containers with a gaseous medium has a blowing piston and a blowing nozzle, through which the container is expanded with the gaseous medium. The blowing piston is movable in a longitudinal direction (L) of the blowing nozzle, the blowing nozzle is movable in the longitudinal direction (L) relative to the blowing piston, and a guide device is provided which guides the movement of the blowing nozzle in the longitudinal direction (L) relative to the blowing piston.

19 Claims, 3 Drawing Sheets

BLOWING APPARATUS FOR EXPANDING CONTAINERS

BACKGROUND OF THE INVENTION

The invention relates to an apparatus for treating containers and in particular to a blowing apparatus for expanding containers. In addition, the invention also relates to a method for expanding containers.

From the prior art, it is known in the context of producing various vessels to expand the latter using a blowing nozzle. To this end, suitable blanks are heated and then are acted upon by compressed air at a pressure in the region of approximately 40 bar through a blowing nozzle. By virtue of this pressure, the container is expanded. It is known from the prior art that a sealing between the blowing apparatus and the container takes place during the actual expansion process, i.e. the process during which the container is expanded with the compressed air, so that the container can be properly expanded. It is known to perform such sealing for example at the upper rim of the mouth of the container or also below the mouth rim.

A mouth will hereinafter be understood to mean a region of the preform which has a collar and a region extending beyond this collar in the direction of the pouring opening. According to one preferred further development, the mouth has a thread. A collar is understood to mean a radially protruding, at least partially circumferential accumulation of material which is preferably configured as a ring. In this case, the collar may be configured as a carrying ring, but also as a securing ring. However, the invention is not limited to the use of the above mouths.

In order to achieve this sealing, in the prior art the blowing piston is lowered onto the vessel and is usually pressed against the latter. In doing so, the contact pressure can be controlled only with relative difficulty. An excessively high pressure on the mouth of the preform may lead to deformations, and an excessively low pressure may result in insufficient sealing between the blowing apparatus and the container.

SUMMARY OF THE INVENTION

The object of the present invention is therefore to improve a blowing process for plastic containers and in particular to improve the sealing between the blowing apparatus and the container, without at the same time risking deformation of the preform.

The blowing apparatus according to the invention for expanding containers with a gaseous medium comprises a blowing piston and a blowing nozzle, wherein the container is expanded with the gaseous medium through the blowing nozzle. According to the invention, the blowing piston is movable in a longitudinal direction of the blowing nozzle and the blowing nozzle is likewise movable in the longitudinal direction relative to the blowing piston, and furthermore a guide device is provided which guides the movement of the blowing nozzle in the longitudinal direction relative to the blowing piston.

According to the invention, therefore, two different degrees of freedom of movement are provided, namely on the one hand a degree of freedom of movement of the blowing piston in a longitudinal direction, wherein this longitudinal direction is usually also the longitudinal direction of the container to be expanded, and also a degree of freedom of movement of the blowing nozzle relative to the blowing piston in the longitudinal direction. By virtue of this further degree of freedom of movement in the longitudinal direction, finer control of the contact pressure of the blowing apparatus relative to the container is possible.

In a further advantageous embodiment, the blowing nozzle is configured in such a way that it is urged towards the container by the gaseous medium as the container is acted upon by the gaseous medium. This means that the air flow which brings about an expansion of the container at the same time also urges the blowing nozzle and possibly also the guide device towards the container and thus brings about a sealing effect between the container and the guide device.

In a further advantageous embodiment, the blowing nozzle is arranged radially inside the guide device and is in this way guided by the guide device.

In a further preferred embodiment, the blowing apparatus comprises a pretensioning device which urges the blowing nozzle towards the container in the longitudinal direction relative to the blowing piston and possibly also relative to the guide device. In this embodiment, with particular preference, the blowing nozzle is movably guided in parallel with the blowing piston axis and is pretensioned by means of a spring, preferably a coil spring. In this case, the guide is likewise mounted on the blowing piston. A certain pretensioning of the nozzle relative to the container is thus brought about by the spring.

In a further advantageous embodiment, the blowing nozzle comprises a first section (nozzle section) with a first internal cross-section and a second section (nozzle piston) with a second internal cross-section. In this case, the first internal cross-section differs from the second internal cross-section. With particular preference, there is provided a lower cross-section of the blowing nozzle and an upper cross-section which is larger in comparison thereto. In other words, the nozzle preferably has a nozzle diameter adapted to the associated preform diameter and also a resulting surface area adapted to the desired contact pressure between the nozzle and the preform.

The gaseous medium flowing through the nozzle in order to expand the container in this way exerts a pressure on the resulting surface area which results from the difference between the two internal cross-sections, and in this way causes the nozzle and/or the guide device to press against the container. More specifically, preferably the nozzle itself has a sealing means which brings about the sealing relative to the upper rim of the mouth for example or also other regions of the mouth. The sealing means may be both an elastomer and also the nozzle itself, so that then a seal between metal (blowing nozzle) and plastic (container).

In a further preferred embodiment, the internal cross-section of the blowing nozzle tapers in the longitudinal direction from top to bottom. This tapering may preferably be continuous. In this case, the tapering internal cross-section means that the medium passing through the blowing nozzle urges the blowing nozzle towards the container.

In a further advantageous embodiment, the guide device has an inner wall which surrounds the mouth of the container at least partially but around the entire circumference during the blowing process in the longitudinal direction of the container. In this way, it is possible to achieve an improved centring of the blowing apparatus relative to the container to be expanded.

A guide device is understood to mean any device which guides a movement of one element relative to another element. Preferably, the guide device is arranged on the blowing piston and immovably in the longitudinal direction relative to a blowing piston. Preferably, the guide device is also detachably arranged on the blowing piston. In this way, for example in the context of changing a fitting, the guide device can be replaced together with the blowing nozzle in order quickly to achieve a changeover to other mouth properties. However, it would also be possible for the guide device to be arranged fixedly on the blowing nozzle and movably relative to the blowing piston. In other words, the concept according to the invention means that there is no need to change the blowing piston when changing a fitting; it is sufficient to replace only the blowing nozzle with its guide device.

In a further advantageous embodiment, the blowing apparatus comprises a sealing device which is in contact with a region of the wall of the container during the blowing process and seals off a space between the blowing nozzle and a wall of the container. As mentioned above, this sealing device is preferably arranged on the blowing nozzle and means that the container can be expanded without the gaseous medium, such as blown air for example, being able to escape to the outside. Preferably, the region of the wall is an upper mouth rim of the container and thus the blowing apparatus is preferably a top-sealing blowing apparatus. This sealing device is preferably made from an elastomer or comprises such an elastomer. However, the sealing device may also be metallic, so that then a sealing takes place between a plastic (container) and a metal (blowing nozzle).

In a further embodiment, the region of the mouth is a region of the outer circumference of the mouth of the container and preferably the carrying ring of the container, and thus the blowing apparatus is an outside-sealing blowing apparatus.

During operation, the blowing piston is moved into a lower end position and the nozzle is pressed onto the preform by the pretensioning device. The preform is then expanded or the bottle is blown. By virtue of the resulting surface area of the nozzle or the abovementioned difference in the internal cross-section, an additional contact pressure besides the spring force is generated via the pressure already exerted by the pretensioning device, which seals off the nozzle relative to the carrying ring or also relative to a region of the mouth.

In a further advantageous embodiment, a sealing ring is provided between the guide device and the blowing nozzle.

In a further advantageous embodiment, the blowing nozzle is secured relative to the guide device by means of a screw body which surrounds the blowing nozzle in the circumferential direction. Preferably, the guide device in this case has a thread. By loosening the screw body, in this way the blowing nozzle itself can be detached from the guide device. The guide device is also detachable from the blowing piston for example by loosening one or more screws.

The present invention also relates to an arrangement for expanding containers, comprising a blowing apparatus of the type described above.

Preferably, the present invention is used in the production of bottles made from plastic, and preferably made from PET.

The invention thus relates in particular to a stretch-blowing machine and in particular to a rotary stretch-blowing machine. Located in a stretch-blowing machine are a plurality of blowing apparatuses according to the invention which in each case comprise at least one blow mould, an apparatus for producing bottles and also preferably at least three valves for switching and controlling the blown air. In this case, these valves control the supply of blown air for expanding the containers. It is pointed out that, in one particularly preferred embodiment, the air which serves for expanding the containers at the same time also serves for achieving an increased contact pressure of the blowing nozzle against the container.

The present invention also relates to a method for filling and expanding containers with a gaseous medium. In a first method step a blowing piston, which comprises a blowing nozzle arranged on this blowing piston such that it can move in the longitudinal direction of the container, is lowered in the longitudinal direction of the container as far as a predefined end position of the blowing piston relative to the container. In a further method step, the container is filled with the gaseous medium through the blowing nozzle.

According to the invention, the gaseous medium flowing through the blowing nozzle during the filling and expansion process causes the blowing nozzle to be urged towards the container in the longitudinal direction of the container and causes the blowing nozzle to exert a pressure on the container in the longitudinal direction.

More specifically, the abovementioned different cross-sections of the blowing nozzle cause the blowing piston to be moved towards the mouth.

However, it would also be possible that the additional pressure of the blowing nozzle on the container is brought about by a pretensioning device such as a coil spring instead of by the air flow. In this case, it is also possible to configure the coil spring or the arrangement thereof in such a way that the spring force on the blowing nozzle can be varied by the user. With particular preference, however, the pressure on the container is brought about both by the coil spring and also by the air flowing through during the expansion process.

In this preferred embodiment, therefore, the blowing nozzle is pretensioned relative to the container by means of a pretensioning device or spring device. In a further advantageous method, the blowing nozzle is guided movably in the longitudinal direction relative to the blowing piston by means of a guide device.

BRIEF DESCRIPTION OF THE DRAWINGS

Further advantages and embodiments will emerge from the appended drawings.

In the drawings.

DETAILED DESCRIPTION

Figure 1:
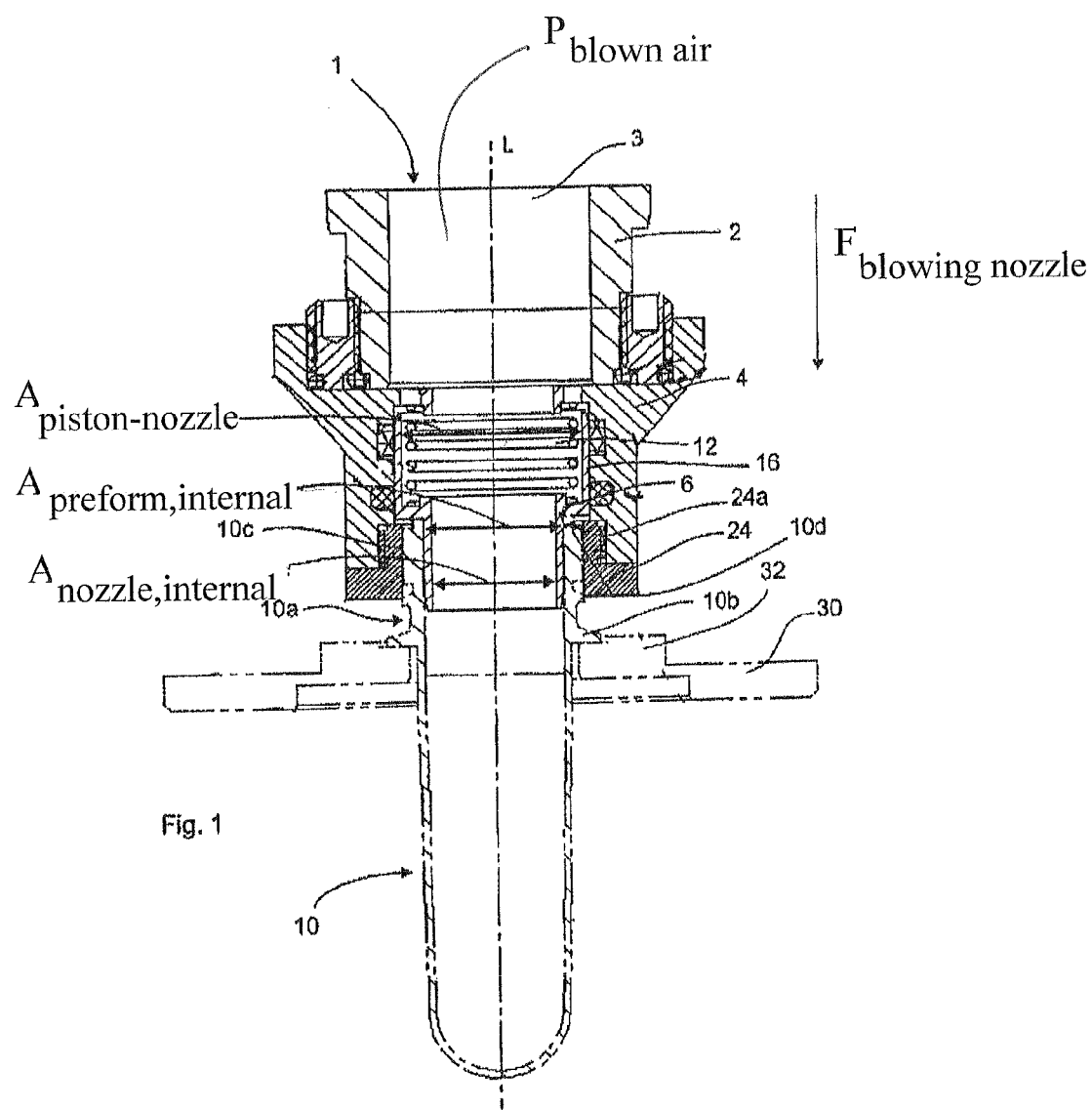
FIG. 1 shows a blowing apparatus according to the invention with a container to be expanded.

FIG. 1 shows a blowing apparatus 1 according to the invention in a first embodiment. This blowing apparatus 1 comprises a blowing piston 2. The blowing piston 2 is moved into a certain (end) position by means of a guide cam (not shown) in order in this (end) position to supply compressed air to a container 10, here a preform, so as to expand the latter. The container 10 is arranged in a blow mould (not shown) with the aid of a centring plate 30. Reference 32 denotes a protrusion of the centring plate 30, on which a carrying ring 10b of the container is supported. Reference 10a denotes in its entirety a mouth of the container 10. Provided on this mouth 10a are a thread 10c and also a further ring 10d.

A guide device 4 is detachably mounted on the blowing piston 2. A blowing nozzle 6 is arranged such that it can move in a longitudinal direction L relative to this guide device 4. The blowing nozzle 6 is moved towards the container 10 by means of a spring. Reference 24 denotes a screw body, by means of which the blowing nozzle 6 is screwed into the guide device 4. More specifically, this screw body 24 has a screw thread 24a which cooperates with a corresponding internal thread of the guide device 4.

The blowing nozzle 6 has an internal cross-section $A_{nozzle\text{-}internal}$. In addition, the blowing nozzle 6 has a nozzle piston 16 which is movable in the longitudinal direction L relative to the guide device 4. This nozzle piston 16 has an internal cross-section $A_{piston\text{-}nozzle}$. Reference $A_{preform,internal}$ denotes the internal cross-section of the preform or container 10, in particular of the mouth 10a thereof.

Through an opening 3 of the blowing piston 2, the nozzle 6 and thus the container 10 is acted upon with compressed air having the pressure $P_{blown\ air}$. This compressed air results in the force $F_{blowing\ nozzle}$ acting on the blowing nozzle, as follows:

$$F_{blowing\ nozzle} = P_{blown\ air} \cdot (A_{piston\text{-}nozzle}-) - (A_{preform,internal} - A_{nozzle,internal})$$

$$F_{blowing\ nozzle} = P_{blowing\ nozzle} \cdot (A_{piston\text{-}nozzle} - A_{preform,internal})$$

This means that the force $F_{blowing\ nozzle}$ acting on the blowing nozzle F depends only on the internal cross-section $A_{piston\text{-}nozzle}$ of the piston 16 and on the internal cross-section $A_{preform,internal}$ of the container 10. Therefore, according to the invention, the blowing nozzle 6 has a nozzle diameter adapted to the associated preform diameter and also a resulting surface area adapted to the desired contact pressure between the blowing nozzle 6 and the container 10. This adaptation takes place by a suitable choice of guide diameter or guide radius $R_{guide}$, since the resulting surface area $A_{res}$ is obtained as follows:

$$A_{res} = ((R_{guide})^2 - (R_{nozzle})^2) \cdot \pi$$

The radius of the blowing nozzle $R_{nozzle}$ (or of the nozzle section 14) is in this case already determined by the type of preform.

Figure 2:
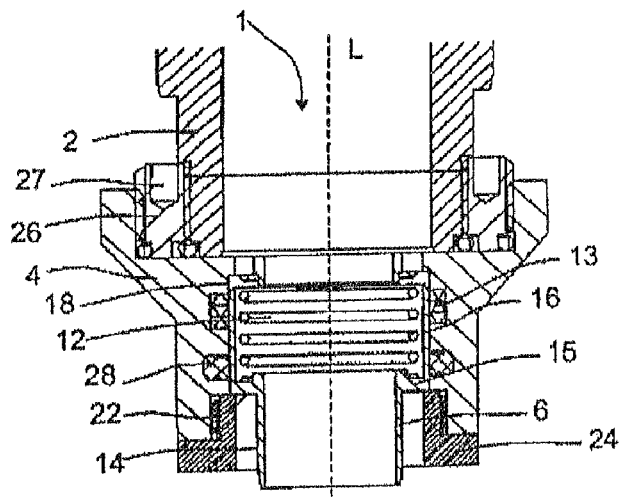
FIG. 2 shows the blowing apparatus of FIG. 1 in a first operating position.

FIG. 2 shows a blowing apparatus of FIG. 1 in a first operating position, i.e. before the blowing apparatus 1 is placed onto the mouth 10a of the container 10 (or preferably the outer wall of this mouth 10a). The guide device 4 is securely but detachably mounted on the blowing piston 2 via a screw connection 26, 27. The compressed air passes through the blowing piston 2 in the direction L towards the blowing nozzle 6. This blowing nozzle 6 has a nozzle section 14 and the nozzle piston 16 already mentioned above. This nozzle piston 16 and the nozzle section 14 are formed in one piece with one another and are joined via a radially running ring 15. Reference 28 denotes a sealing device, by means of which the blowing piston 6 is sealed off relative to the guide device 4.

In the embodiment shown in FIG. 2, the blowing piston 2 has a sealing device 22 on its underside, which can be pressed against a mouth rim 10e of the container 10.

Reference 13 denotes a guide ring for guiding the blowing nozzle 6 relative to the guide device 4. The screw body 24 or the limiting nut 24 at the same time limits the movement of the blowing nozzle 6 relative to the guide device 4 in the longitudinal direction L.

Figure 3:
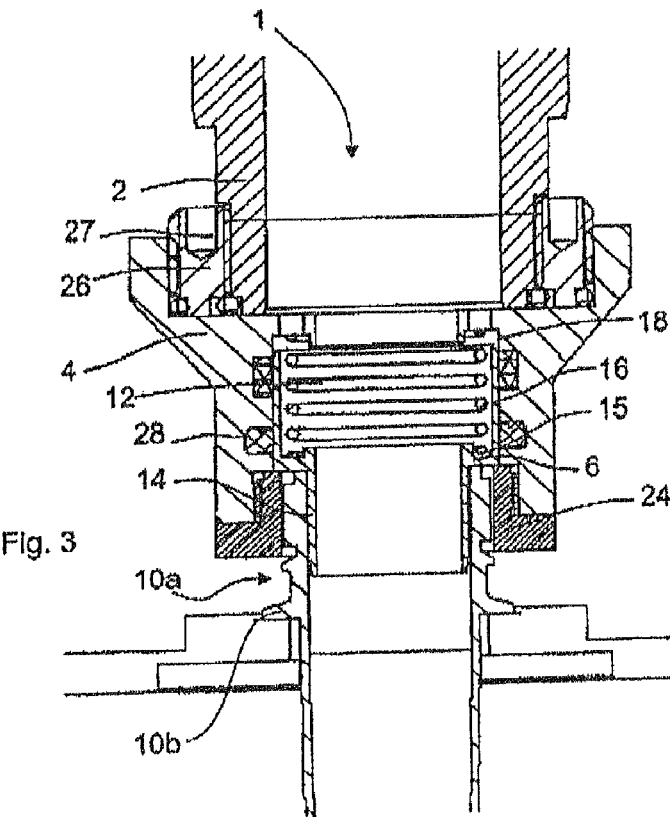
FIG. 3 shows the blowing apparatus of FIG. 1 in a second operating position.

FIG. 3 shows a position of the blowing apparatus 1 in which it is in contact with the mouth 10a of the container 10. More specifically, the abovementioned mouth rim 10e now bears against the sealing device 22 of the blowing nozzle 6, so that the space located between the blowing nozzle 6, more specifically the nozzle section 14 thereof, and the container 10 is sealed off.

Figure 4:
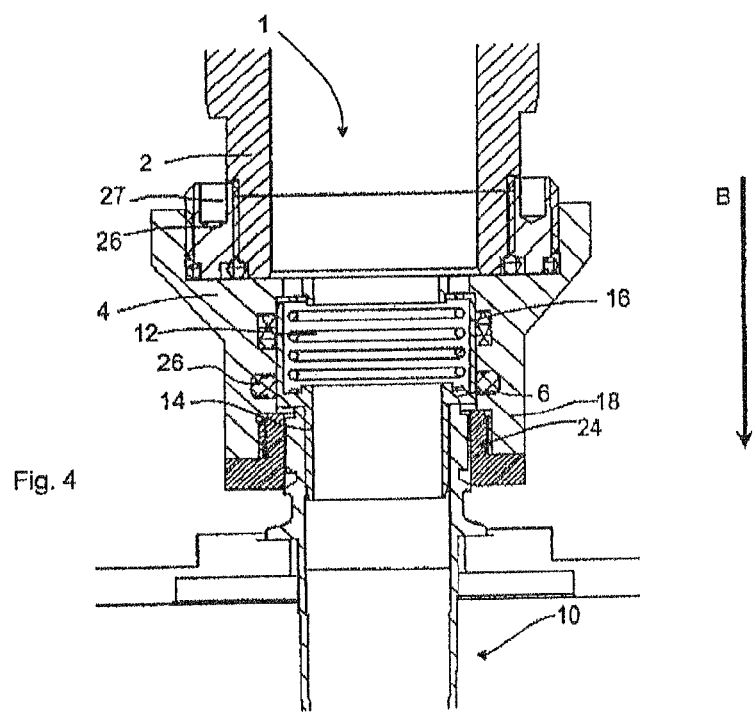
FIG. 4 shows the blowing apparatus of FIG. 1 in a third operating position.

In the diagram shown in FIG. 4, the blowing piston 2 has again been moved downwards slightly and, since the blowing nozzle already bore against the upper rim 10e of the container 10 in the situation shown in FIG. 3, in this way brings about a pretensioning of a pretensioning device or spring 12. More specifically, the blowing nozzle 6 is biased relative to the guide device 4 in the downward direction, i.e. onto the container 10, by the spring 12.

Starting from the situation shown in FIG. 4, the blowing piston 2 and thus also the blowing nozzle 6 is acted upon by compressed air, which leads to a further pressure acting in the direction B being exerted on the blowing nozzle 6 according to the above equation. By virtue of this pressure, the sealing effect between the container 10 and the blowing nozzle 6 is increased. Since the force acting on the container from the blowing nozzle also depends directly on the pressure of the blown air, the contact pressure of the blowing nozzle 6 on the upper rim 10e of the container 10 is also increased as the pressure of the blown air increases, and thus the sealing effect is at the same time increased when the pressure of the blown air is increased.

Figure 5:
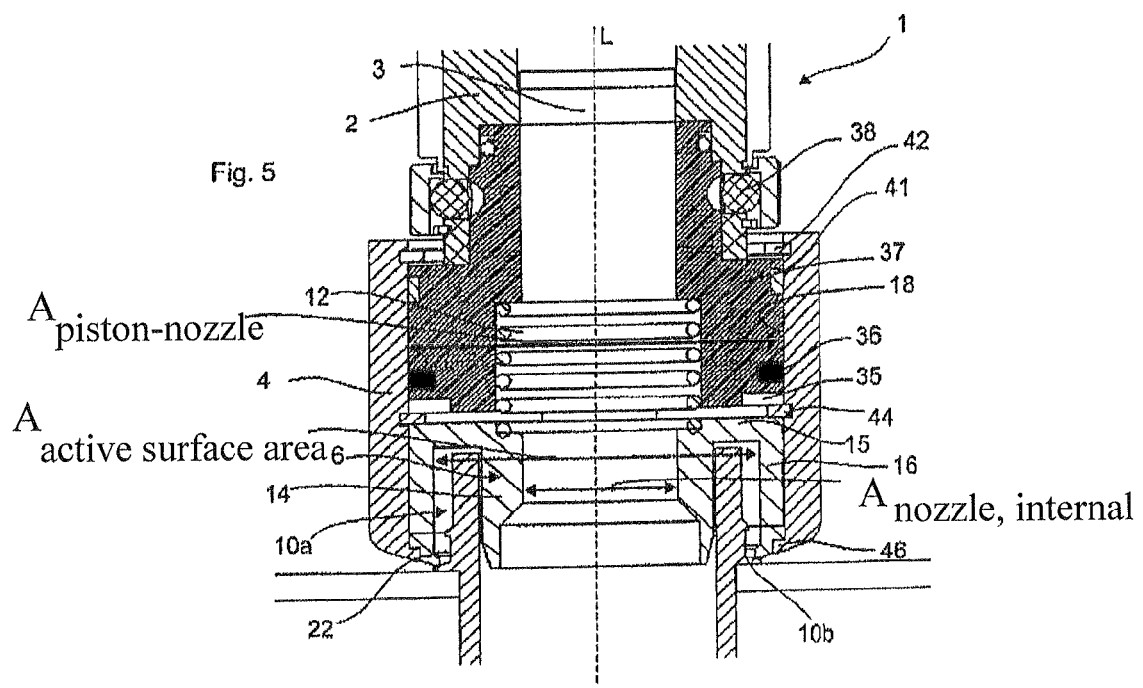
FIG. 5 shows a further blowing apparatus according to the invention.

FIG. 5 shows a further embodiment of a blowing apparatus 1 according to the invention. Unlike the blowing apparatus 1 shown in the preceding figures, here a sealing of the container 10 from the outside takes place, more specifically via the carrying ring 10b of the container 10. In this embodiment, the guide device 4 is fixedly arranged on the blowing nozzle 6 in the longitudinal direction L. More specifically, the guide device 4 is arrested in the longitudinal direction by a lower lug 46 and a first securing ring 44. On the other hand, however, the guide device 4 is movable in the longitudinal direction L relative to the blowing piston 2 or an intermediate piece fixedly arranged on this blowing piston 2. In addition to the aforementioned first securing ring 44, a second securing ring 42 is provided on the inner circumference of the guide device 4. The range by which the guide device 4 can be displaced in the longitudinal direction L relative to the intermediate piece 37 and thus also the blowing piston 2 is determined by the distance between these two securing rings and optionally also the width of the recess 35.

Reference 36 denotes a sealing device which is provided between the guide device 4 and the intermediate piece 37, more specifically an inner wall 18 of the guide device 4 and the intermediate piece 37. Reference 41 denotes a guide ring.

The intermediate piece 37 is arranged here on the blowing piston 2 with the aid of a quick-action fastener, wherein reference 38 denotes balls of this quick-action fastener. However, other possibilities are also conceivable for arranging the intermediate piece 37 on the blowing piston, such as screw threads for example.

Reference 12 once again denotes here a coil spring which is provided between the blowing nozzle 6 and the blowing piston 2, more specifically the intermediate piece 37 fixedly arranged on the blowing piston 2.

In the embodiment shown in FIG. 5, the force $F_{blowing\ nozzle}$ acting on the blowing nozzle by the compressed air is as follows:

$$F_{blowing\ nozzle} = P_{blown\ air} \cdot (A_{piston\text{-}nozzle} - A_{nozzle,internal}) - (A_{active\ surface\ area} - A_{nozzle,internal})$$

$$F_{blowing\ nozzle} = P_{blown\ air} \cdot (A_{piston\text{-}nozzle} - A_{active\ surface\ area})$$

The force acting on the blowing nozzle thus also depends only on the cross-section $A_{piston\text{-}nozzle}$ of the nozzle piston 16 and on the active surface area $A_{active\ surface\ area}$.

It is pointed out that the respective subtrahend in the above equations is obtained by the counter-pressure which is in turn directed upwards from the container, i.e. in the direction of the blowing nozzle. To a good approximation, this pressure corresponds to the abovementioned pressure of the blown air $P_{blown\ air}$.

All of the features disclosed in the application documents are claimed as essential to the invention in so far as they are novel individually or in combination with respect to the prior art.

The invention claimed is:

1. A method for expanding containers with a gaseous medium, comprising the steps:
   lowering a blowing piston, which has a blowing nozzle arranged on the blowing piston such that it can be moved in a longitudinal direction (L) of the container, in the longitudinal direction of the container as far as a predefined end position of the blowing piston relative to the container;
   filling the container with the gaseous medium through the blowing nozzle;
   wherein the guide device has an inner wall which surrounds a mouth of the container during the blowing process.

2. The method for filling containers according to claim 1 wherein the blowing nozzle is pretensioned relative to the container using a pretensioning device.

3. The method according to claim 1, wherein the blowing nozzle is guided movably in the longitudinal direction (L) relative to the blowing piston using a guide device.

4. The method for filling containers according to claim 1, wherein the blowing nozzle comprises a nozzle section with a first internal cross-section ($A_{nozzle,internal}$) and a nozzle piston with a second internal cross-section ($A_{piston-nozzle}$), wherein the second internal cross-section ($A_{piston-nozzle}$) differs from the first internal cross-section ($A_{nozzle,internal}$), and wherein the nozzle piston and the nozzle section are formed in one piece with one another, wherein by means of the different internal cross-sections is caused that the gaseous medium flowing through the blowing nozzle during the filling process causes the blowing nozzle to exert a pressure on the container in the longitudinal direction (L).

5. A blowing apparatus for expanding containers with a gaseous medium, comprising a blowing piston and a blowing nozzle, through which the container is expanded with the gaseous medium, wherein the blowing piston is moveable in a longitudinal direction (L) of the blowing nozzle, the blowing nozzle is moveable in the longitudinal direction (L) relative the blowing piston, and a guide device is provided which guides the movement of the blowing nozzle in the longitudinal direction (L) relative to the blowing piston, wherein the guide device has an inner wall which surrounds a mouth of the container during the blowing process.

6. The blowing apparatus according to claim 5, wherein the blowing nozzle is configured in such a way that it is urged towards the container by the gaseous medium as the container is acted upon by the gaseous medium.

7. The blowing apparatus according to claim 5, wherein the blowing nozzle is arranged radially inside the guide device.

8. The blowing apparatus according to claim 5, wherein the blowing apparatus comprises a pretensioning device which urges the blowing nozzle towards the container in the longitudinal direction (L) relative to the blowing piston.

9. The blowing apparatus according to claim 5, wherein the guide device is arranged on the blowing piston and immovably in the longitudinal direction (L) relative to the blowing piston.

10. The blowing apparatus according to claim 5, wherein the guide device is detachably arranged on the blowing piston.

11. The blowing apparatus according to claim 5, wherein the blowing apparatus comprises a sealing device which is in contact with a region of the mouth of the container during the blowing process and seals off a space between the blowing nozzle and the region of the mouth of the container.

12. The blowing apparatus according to claim 11, wherein the region of the mouth is an upper mouth rim of the container.

13. The blowing apparatus according to claim 11, wherein the region of the mouth is a region of the outer circumference of the mouth of the container.

14. The blowing apparatus according to claim 5, wherein a sealing ring is arranged between the guide device and the blowing nozzle.

15. The blowing apparatus according to claim 5, wherein the blowing nozzle is secured relative to the guide device using a screw body which surrounds the blowing nozzle in the circumferential direction.

16. An arrangement for expanding containers, comprising a blowing apparatus according to claim 5.

17. The blowing apparatus according to claim 5, wherein the blowing nozzle comprises a nozzle section with a first internal cross-section ($A_{nozzle,internal}$) and a nozzle piston with a second internal cross-section ($A_{piston-nozzle}$), wherein the second internal cross-section ($A_{pistol-nozzle}$) differs from the first internal cross-section ($A_{nozzle,internal}$), and wherein the nozzle piston and the nozzle section are formed in one piece with one another.

18. A blowing apparatus for expanding containers with a gaseous medium, comprising a blowing piston and a blowing nozzle through which the container is expanded with the gaseous medium, wherein the blowing piston is movable in a longitudinal direction (L) of the blowing nozzle, the blowing nozzle is movable in the longitudinal direction (L) relative to the blowing piston, and a guide device is provided which guides the movement of the blowing nozzle in the longitudinal direction (L) relative to the blowing piston, wherein the blowing nozzle is secured relative to the guide device using a screw body which surrounds the blowing nozzle in the circumferential direction.

19. The blowing apparatus according to claim 18, wherein the blowing nozzle comprises a nozzle section with a first internal cross-section ($A_{nozzle,internal}$) and a nozzle piston with a second internal cross-section ($A_{piston-nozzle}$), wherein the second internal cross-section ($A_{piston-nozzle}$) differs from the first internal cross-section ($A_{nozzle,internal}$), and wherein the nozzle piston and the nozzle section are formed in one piece with one another.

* * * * *